(12) United States Patent
Seto et al.

(10) Patent No.: US 6,999,874 B2
(45) Date of Patent: Feb. 14, 2006

(54) NAVIGATION DEVICE AND RELATED METHOD

(75) Inventors: Fumio Seto, Yokosuka (JP); Okihiko Nakayama, Yokohama (JP); Masaki Watanabe, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 46 days.

(21) Appl. No.: 10/700,497

(22) Filed: Nov. 5, 2003

(65) Prior Publication Data
US 2004/0093156 A1 May 13, 2004

(30) Foreign Application Priority Data
Nov. 13, 2002 (JP) .......................... P2002-329554

(51) Int. Cl.
*G01C 21/00* (2006.01)
(52) U.S. Cl. ...................................... 701/211; 701/200
(58) Field of Classification Search ................ 701/200, 701/1; 381/86, 110–112; 704/246
See application file for complete search history.

(56) References Cited

U.S. PATENT DOCUMENTS

2003/0060937 A1 * 3/2003 Shinada et al. ................ 701/1

FOREIGN PATENT DOCUMENTS

JP 7-319383 12/1995

* cited by examiner

*Primary Examiner*—Yonel Beaulieu
(74) *Attorney, Agent, or Firm*—McDermott Will & Emery LLP

(57) ABSTRACT

A navigation device, installed on a vehicle to enable information to be provided to an occupant of the vehicle, includes a display section providing a display of an image to the occupant of the vehicle, a speech recognition section executing speech recognition processing for a voice input relating to a speech recognition object word that forms a word to be an objective for speech recognition, and an information providing processor section compelling a predetermined image to be displayed on the display section depending on a recognized content resulting through the speech recognition processing in the presence of recognition of the speech recognition object word resulting through the speech recognition processing. The speech recognition section executes second speech recognition processing for the speech recognition object word except for the speech recognition object word present in the image currently displayed in the display section in the presence of a failure in recognition of the speech recognition object word.

16 Claims, 9 Drawing Sheets

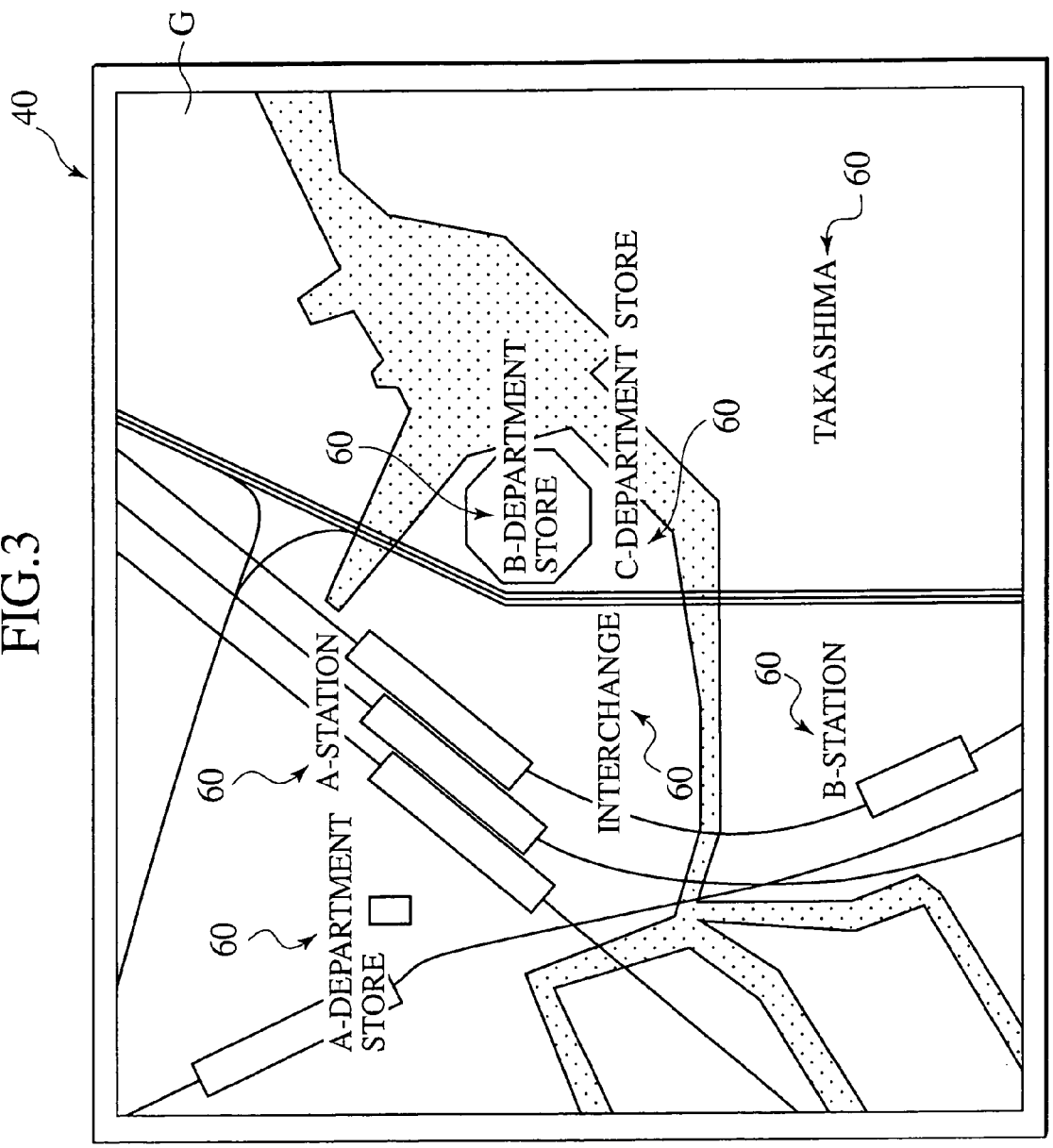

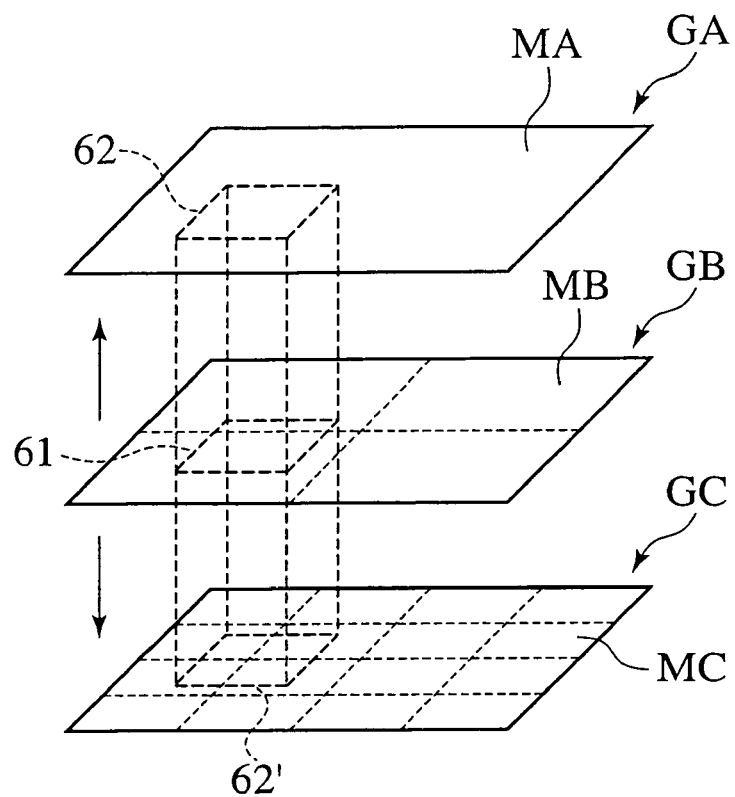
FIG.4A
FIG.4B
FIG.4C
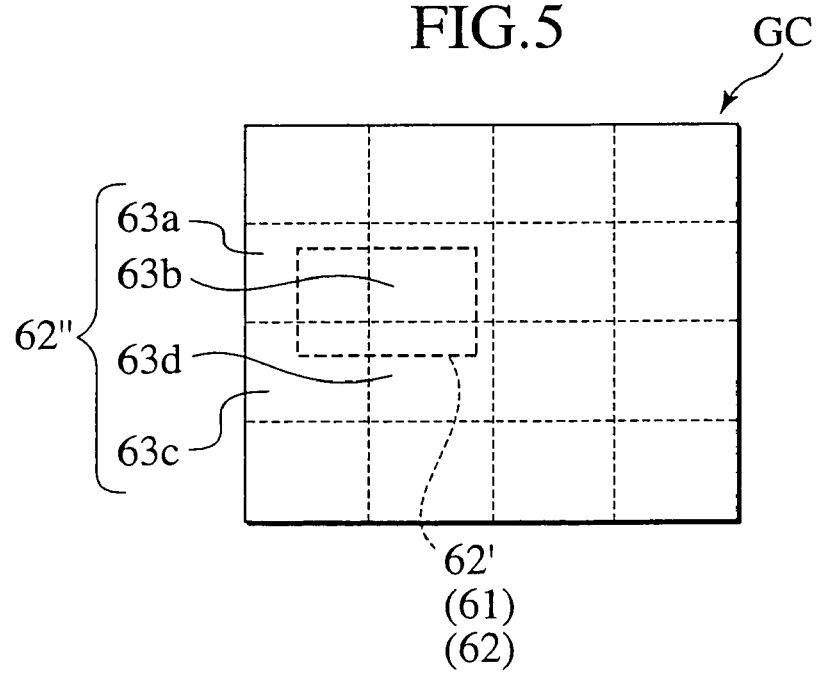
FIG.5

| DAYS OF WEEK | AVG DIST FOR DAYS OF WEEK |
|---|---|
| WEEKDAYS (MONDAY TO FRIDAY) | 70km |
| HOLIDAYS (SATURDAY AND SUNDAY) | 95km |

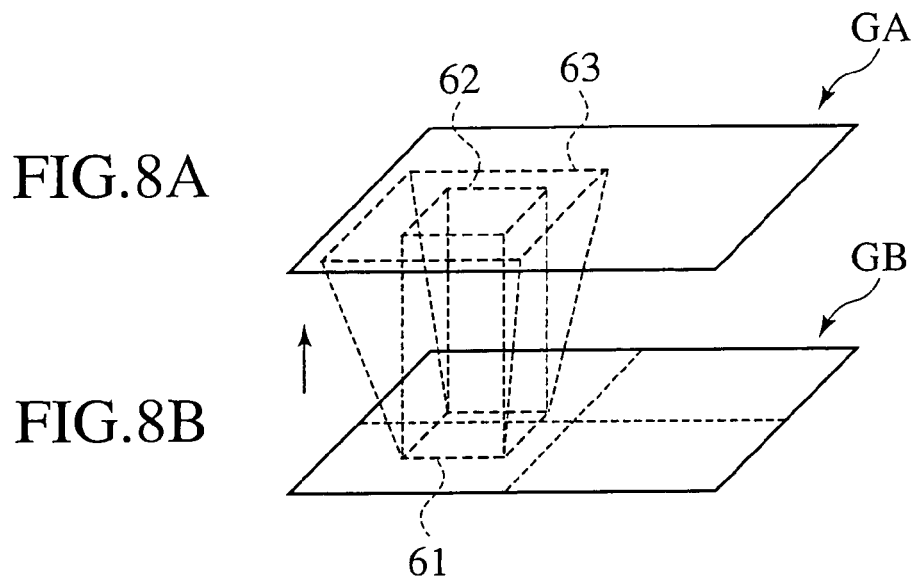
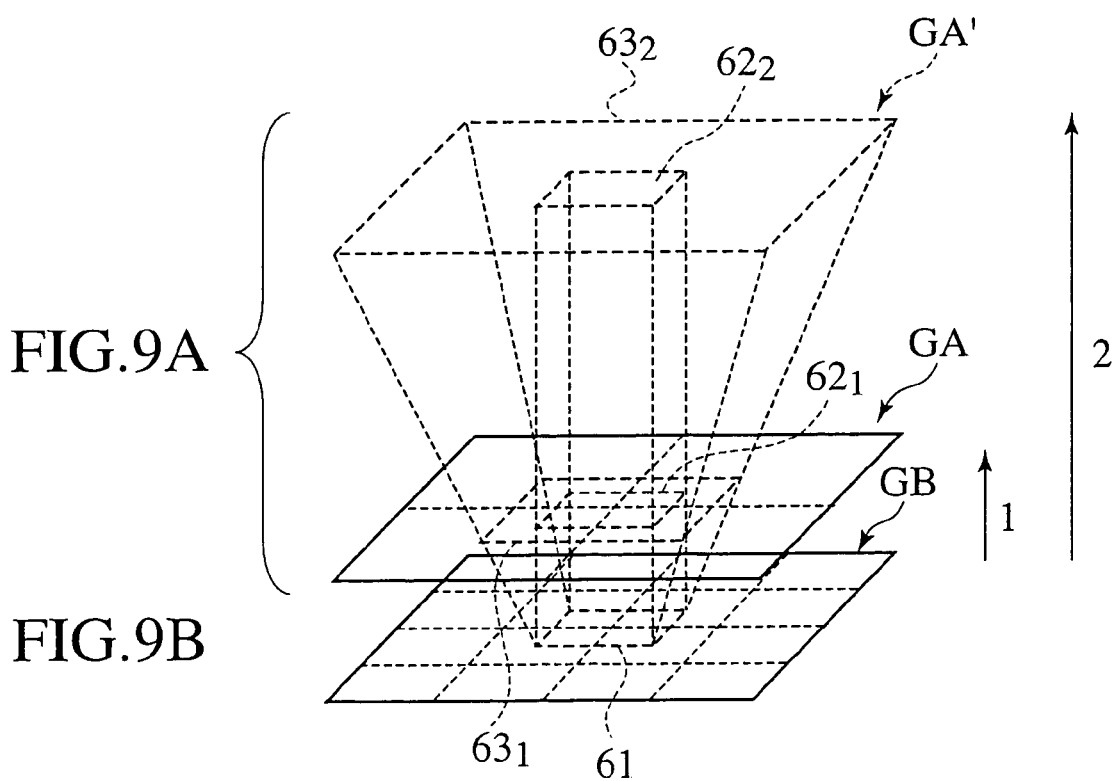

FIG.10A
FIG.10B
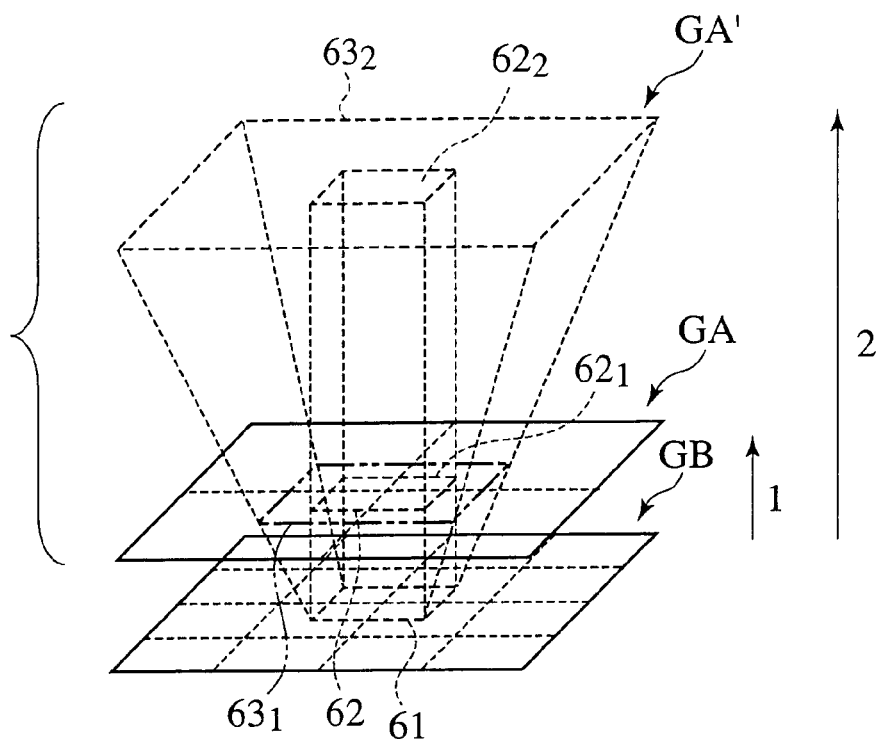
FIG.11A
FIG.11B
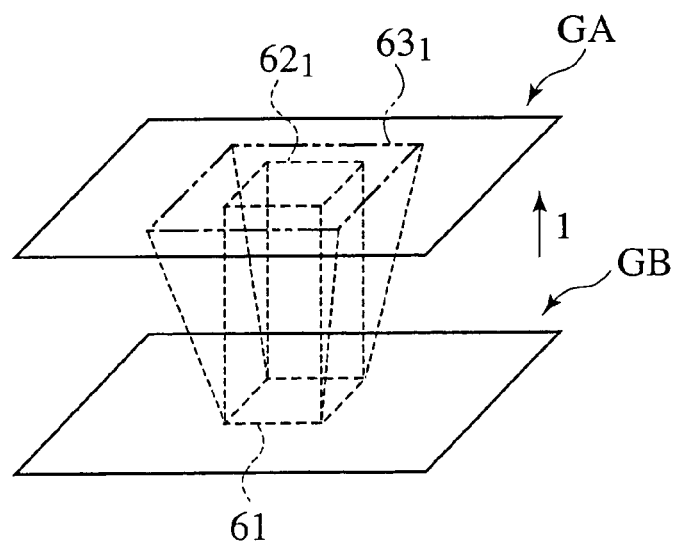

NAVIGATION DEVICE AND RELATED METHOD

BACKGROUND OF THE INVENTION

The present invention relates to a navigation device and its related method and, more particularly, to a navigation device that is operative particularly through a voice and its related method.

Japanese Patent Application Laid-Open Publication No. H7-319383 discloses a navigation device that allows a user to voice input for a speech recognition object word displayed on a screen to enable a map to be shifted on the screen.

SUMMARY OF THE INVENTION

However, upon studies conducted by the present inventors, with such a navigation device, a probability occurs in that even a speech recognition object word, related to a place name or the like displayed on a screen of a display once in the midcourse of operation, tends to suffer from an inability to be displayed on the current screen under a situation where the screen is subsequently varied.

In such a case, it is conceivable for a user to voice input the speech recognition object word related to the place name or the like that has not been already displayed on the screen and, even in the presence of the voice input, substantially, it is conceived that a situation occurs where it becomes hard to designate the place name.

The present invention has been completed upon such studies and has an object to provide a navigation device and a related method that enable a speech recognition object word to be easily and reliable designated.

To achieve the above object, one aspect of the present invention is a navigation device adapted to be installed on a vehicle and enabling information to be provided to an occupant of the vehicle, the navigation device comprising: a display section displaying an image to an occupant of a vehicle; a speech recognition section executing speech recognition processing for a voice input relating to a speech recognition object word that is a word to be an object for speech recognition, in such a manner that in a case that a failure occurs in recognition as to the speech recognition object word, second speech recognition processing is executed for the speech recognition object word except for the speech recognition object word present in the image currently displayed in the display section; and an information providing processor section compelling a predetermined image to be displayed on the display section based on a recognized content resulting through the speech recognition processing in a case that the speech recognition object word is recognized through the speech recognition processing.

In other words, another aspect of the present invention is a navigation device adapted to be installed on a vehicle and enabling information to be provided to an occupant of the vehicle, the navigation device comprising: displaying means for displaying an image to an occupant of a vehicle; speech recognition processing means for processing to execute speech recognition processing for a voice input relating to a speech recognition object word that is a word to be an object for speech recognition, in such a manner that in a case that a failure occurs in recognition as to the speech recognition object word, second speech recognition processing is executed for the speech recognition object word except for the speech recognition object word present in the image currently displayed in the display section; and information providing processing means for processing to compel a predetermined image to be displayed on the display section based on a recognized content resulting through the speech recognition processing in a case that the speech recognition object word is recognized through the speech recognition processing.

In the meanwhile, another aspect of the present invention is a method of recognizing a speech in a navigation device adapted to be installed on a vehicle and enabling information to be provided to an occupant of the vehicle through a display section, the method comprising: executing, when speech recognition processing for a voice input relating to a speech recognition object word that is a word to be an object for speech recognition is performed and in the presence of a failure of recognition for the speech recognition object word, second speech recognition processing for the speech recognition object word except for the speech recognition object word present in the image currently displayed in a display section; and displaying, when the speech recognition processing for the voice input relating to the speech recognition object word and in the presence of recognition of the speech recognition object word, a predetermined image on the display section based on a recognized content resulting through the speech recognition processing.

Other and further features, advantages, and benefits of the present invention will become more apparent from the following description taken in conjunction with the following drawings.

BRIEF DESCRIPTION OF THE DRAWINGS

FIG. 3 is an illustrative view illustrating a speech recognition object word displayed in an image of a screen of a display of the navigation device of the embodiment;

FIG. 4A is an illustrative view illustrating map image data in which a display corresponding region in an enlarged scale is set, FIG. 4B is an illustrative view illustrating map image data in which a display region in a current display scale is set, and FIG. 4C is an illustrative view illustrating map image data in which a display corresponding region in contracted scale is set, respectively in the embodiment;

FIG. 5 is an illustrative view illustrating a display corresponding region in a case that map image data is prepared in mesh shapes, in the embodiment;

FIG. 8A is an illustrative view principally illustrating an expanded region that is for use as one example of the processing in step ST106 and set in map image data in an enlarged scale with a current display scale being enlarged, and FIG. 8B is an illustrative view illustrating a display region in map image data in a current display scale, respectively in the embodiment;

FIG. 9A is an illustrative view illustrating an expanded region that is for use as another example of the processing in step ST106 and set in map image data in an enlarged scale with a current display scale being 9B is an illustrative view illustrating a display region in map image data in a current display scale, respectively in the embodiment;

FIG. 10A is an illustrative view illustrating a display corresponding region and an expanded region that is for use as another example of the processing in step ST106 and set in map image data in an enlarged scale with a current display scale being enlarged, and FIG. 10B is an illustrative view illustrating a display region in map image data in a current display scale, respectively in the embodiment;

FIG. 11A is an illustrative view principally illustrating a display corresponding region set in map image data in an enlarged scale with the current display scale being enlarged as shown in FIGS. 10A and 10B, and FIG. 11B is an illustrative view illustrating a display region in map image data in a current display scale, respectively in the embodiment;

DETAILED DESCRIPTION OF THE PREFERRED EMBODIMENT

Hereinafter, a navigation device and its related method of an embodiment according to the present invention are described below in detail with reference to FIGS. 1 to 13.

Figure 1:
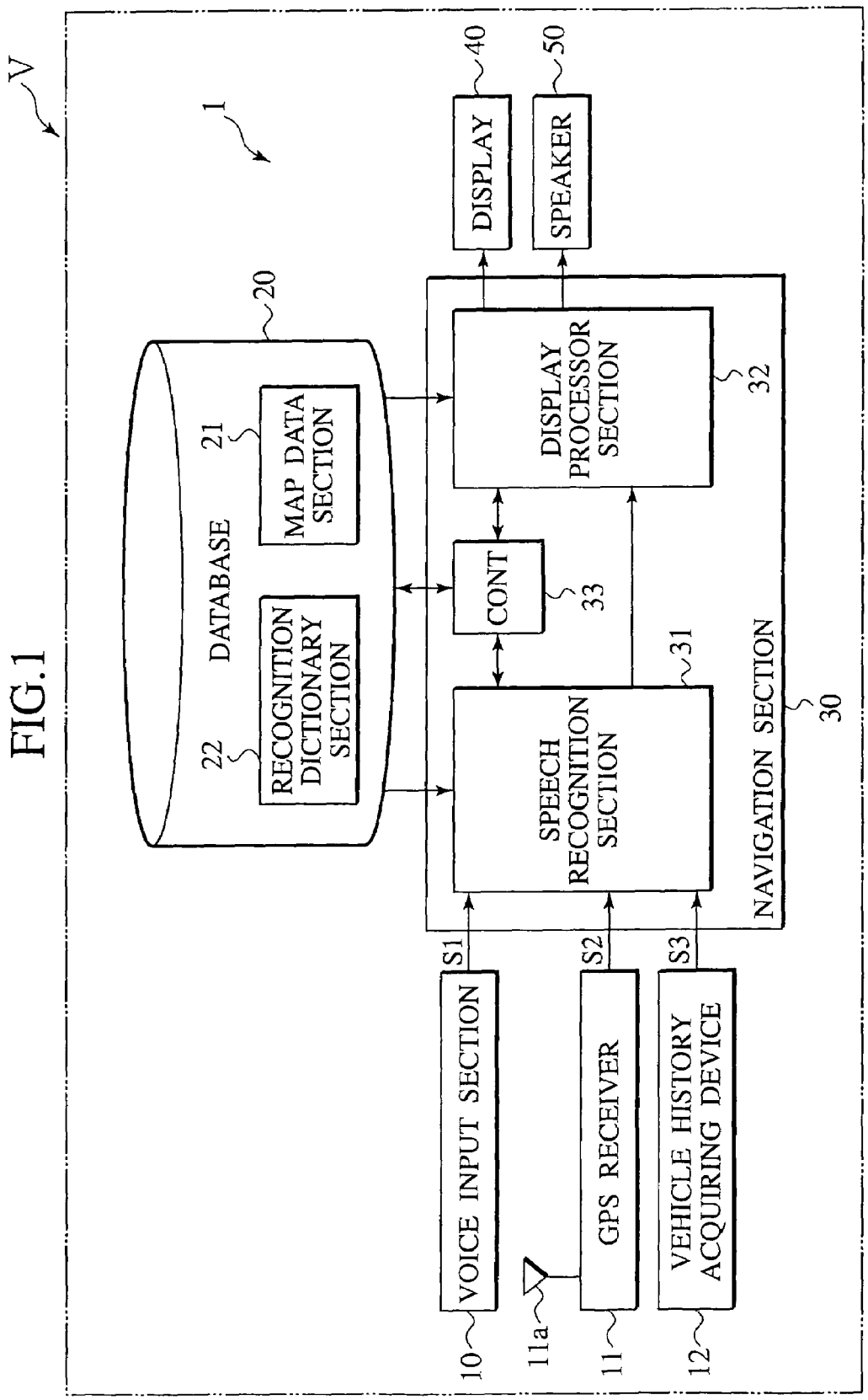
FIG. 1 is a structural view illustrating a structure of a navigation device of an embodiment according to the present invention.

FIG. 1 is a structural view illustrating the navigation of the presently filed embodiment.

As shown in FIG. 1, the navigation device 1 is adapted to be installed in a vehicle V such as an automobile to allow information, such as a traveling route to a destination, to be provided to a user, such as an occupant of the vehicle, through a display unit in accordance with operation of the user.

The navigation device 1 is comprised of a voice input section 10 through which a voice is inputted from the user, which is not shown, to allow the input voice to be converted to digital data to be outputted, a GPS receiver 11 that receives a radio wave delivered from a positioning satellite, which is not shown, through a GPS antenna 11a to obtain a current position of the vehicle and time (date and hour) to be outputted, a vehicle history acquiring device 12 that typically calculate a total sum of travel distances of the vehicle day by day to classify the travel distance data into respective averages by weekdays (such as Monday to Friday) and holidays (such as Saturday and Sunday) and stores these data as a vehicle history, a database section 20 that stores various data, a navigation section 30 that is applied with a digital data signal S1 corresponding to the voice input delivered from the voice input section 10, a signal S2 carrying information indicative of the current position and time (day and hour) delivered from the GPS receiver 11 and a signal S3 carrying vehicle history information delivered from the vehicle history acquiring device 12, a display 40 that displays an image in accordance with on map image data inputted from the navigation section 30, and a speaker 50 that produces a voice in accordance with voice data prepared by and inputted from the navigation section 30.

More particularly, the database section 20 includes a map dada section 21 that has a variety of information such as roads, place names, facilities and land attributes (such as cities and suburbs) and stores the map image data (hereinafter simply called as map data), having speech recognition object words correlated with these items, for each display scale (such as for each of 500 m, 1 km and 10 km), and a recognition dictionary section 22 that that stores and manages a recognition dictionary, for use in speech recognition processing in a speech recognition section 31 of the navigation section 30, in linked relation with the speech recognition object words in the map data of the map dada section 21. Also, the map data section 21 stores the map data for each scale in a form of suitable, mesh-like blocks.

Further, the database section 20 stores and manages the map data inside the map data section 21 in a form to be retrieved and also serves to extract the map data in a predetermined range, together with various information, such as the land attribute, and the speech recognition object words, based on information correlated with the current position or the like for delivery to the navigation section 30.

Furthermore, the navigation section 30 is comprised of the speech recognition section 31 that recognizes a voice input that is inputted with respect to the speech recognition object word, which is a object for speech recognition and principally to be displayed on the display 40, and a display processor section (information providing processor section) 32 that allows a predetermined display image to be displayed on the display 40 based on not only the map image corresponding to the map data but also a recognition result of the speech recognition object word performed by the speech recognition section 31. Also, the speech recognition section 31 and the display processor section 32 of the navigation section 30, and the map data section 21 and the recognition dictionary section 22 of the database section 20 are controlled by a controller 33 to perform various operations. Moreover, it is not objectionable for the controller 33 to involve the speech recognition section 31 and the display processor section 32.

In particular, the controller 33 serves to allow the speech recognition section 31 to acquire the recognition dictionary from the database section 20 for speech recognition and to allow collation between the acquired recognition dictionary and the digital data from the voice input section 10 to execute the speech recognition. Also, the controller 33 serves to allow the display processor section 32 to acquire desired map data from the database section 20 to allow the map image to be combined with various information, such as the land attribute, and the speech recognition object word to be displayed on the display 40, while at the same time serving to allow the speaker 50 to notify a result as to whether the speech recognition object word uttered by the user is present.

Now, a basic sequence of operations of the navigation device with such a structure is described.

Figure 2:
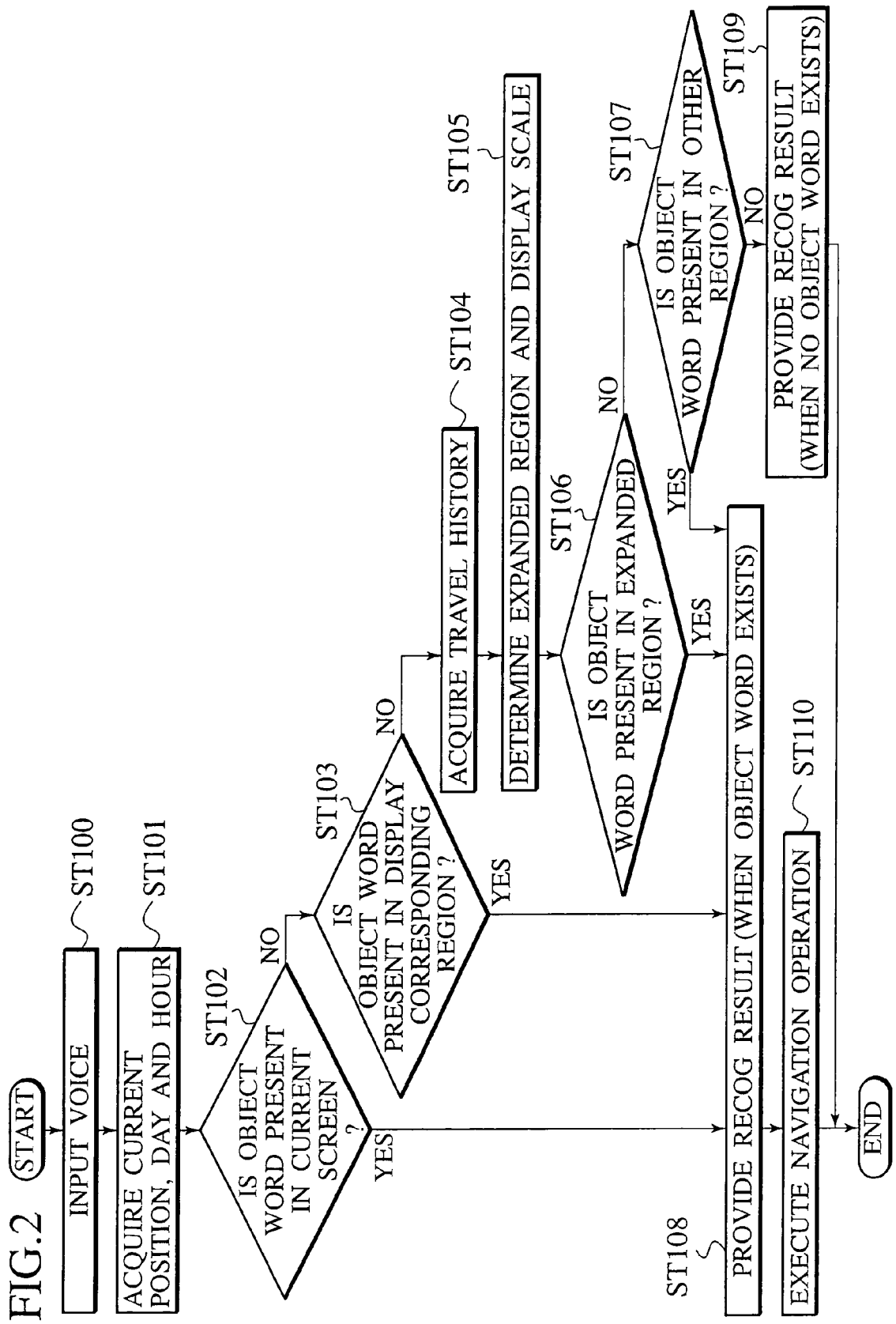
FIG. 2 is a flowchart illustrating a basic sequence of operations of the navigation device of the embodiment.

FIG. 2 is a flowchart illustrating operation of the navigation device 1 of the presently filed embodiment. Also, such operation is executed through control of the navigation section 30 and explanation is made aiming at operation subsequent to voice input from the user.

As shown in FIG. 2, first, the voice input section 10 converts voice input data, resulting from a speech uttered by the user, into digital data with a digital data signal being outputted to the speech recognition section 31 of the navigation section 30 such that the speech recognition section 31 is inputted with such a data signal (step ST100).

Consecutively, the navigation section 30 acquires current position information and time (day and hour) information from the GPS receiver 11, and the speech recognition section 31 is inputted with such data signal (step ST101).

Subsequently, the speech recognition section 31 executes comparison between the speech recognition object word, in the map image currently displayed on a screen of the display 40 based on the map data corresponding to the current position information or the like, and the digital data corresponding to the voice input, and discriminates to find whether the speech recognition object word, in alignment with digital data corresponding to such a voice input, is present on the screen of the display 40 (ST102). In particular, the speech recognition object word displayed in the map image of the current screen is extracted from the database section 20, and the digital data of the voice uttered by the user and the speech recognition object word, which has been extracted, is sequentially collated in the speech recognition section 31 to discriminate to find whether coincidence exist between the two.

Here, description is made of the speech recognition object word present in the map image on the screen of the display 40.

FIG. 3 is an illustrative view showing the speech recognition object word present in the map image of the screen of the display 40.

As shown in FIG. 3, the display 40 displays a plurality of speech recognition object words 60, such as "A-Station" and "A-Department Store", which are objects for speech recognition, in superposed relationship with the map image G in which road information, land information and facility information are displayed.

That is, in the processing of ST102, the comparison is executed between the speech recognition object word 60, currently displayed on the display 40 as shown in FIG. 3, and the digital data corresponding to the voice input from the voice input section 10 and the discrimination is executed in the speech recognition section 31 to find whether there is one which is in coincidence with the such digital data among these speech recognition object words 60.

Consecutively, if discrimination is made that the speech recognition object word 60, coincided with the digital data corresponding to the voice input, is present in the current map image of the screen of the display 40 (in case of "YES" in step ST102), the processing is routed to step ST108 that will be described later.

On the contrary, if discrimination is made that the speech recognition object word 60, coincided with the digital data corresponding to the voice input, is not present in the current map image of the screen of the display 40 (in case of "NO" in step ST102), the speech recognition section 31 discriminates to find whether the speech recognition object word 60, coincided with the digital data corresponding to the voice input, is present in a corresponding region (hereinafter, referred to as "display corresponding region") suitably corresponding to the display region currently displayed on the display 40 (step ST103). In particular, attempt is made this time to allow the speech recognition object words 60, present in the display corresponding region, to be extracted from the database section 20 to execute comparison between the digital data, corresponding to the voice input uttered by the user, and the extracted speech recognition object words 60, and discrimination is made in the speech recognition section 31 to find whether there is one, which coincides with the digital data, among these speech recognition object words 60.

Here, description is made of the display corresponding region that forms an region suitably corresponding to the display region currently displayed on the display 40.

FIG. 4A is an illustrative view showing map data in an enlarged scale, FIG. 4B is an illustrative view showing map data in a current display scale and FIG. 4C is an illustrative view showing map data in a contracted scale.

With respect to square shapes shown with the same size in FIGS. 4A to 4C, the square shape shown in FIG. 4A corresponds to a map image region GA in an enlarged scale (such as a 10 km scale corresponding to a display scale for a wider region in which relatively famous mountains, rivers and buildings are mainly displayed), the square shape shown in FIG. 4B corresponds to a map image region GB in the current display scale (corresponding to a standard display scale, i.e., in a 1 km scale), and the square shape shown in FIG. 4C corresponds to a map image region GC in a contracted scale (corresponding to a detailed display scale, i.e., in a 500 m scale, in which mountains, rivers, buildings and the like are displayed in a more finely fashion), with the map image regions GA to GC corresponding to regions having areas (dimensions) depending upon respective scales in actual terrains. Further, for example, the map image region GA per se in FIG. 4A has certain one mesh block MA, the map image region GB per se in FIG. 4B has four mesh blocks MB resulting from the map image region GB that is divided into four pieces, and the map image region GC per se in FIG. 4C has sixteen mesh blocks MC resulting from the map image region GC that are divided into sixteen pieces. That is, map data in respective scales are segmented into the mesh blocks and, as one example, there is one mesh block MA in FIG. 4A, there are four pieces of mesh blocks MB in FIG. 4B and there are sixteen pieces of mesh blocks MC in FIG. 4C. And, the mesh blocks in the map data in each scale are represented as map elements having the same area (dimensions) but different in locations. As a consequence, in the actual terrains, one mesh block MA in FIG. 4A corresponds to a land district wider than that of one mesh block MB, and one mesh block MC in FIG. 4C corresponds to a land district narrower than that of one mesh block MB in FIG. 4B. Namely, the higher the rate of the enlarged scale of the mesh block, the wider will be the region to be displayed with such a mesh block, and the higher the rate of the contracted scale of the mesh block, the narrower will be the region to be displayed with such a mesh block.

Here, a display region 61 corresponds to the current display image in the image data shown in FIG. 4B, and a region 62 formed by projecting the display region 61 of the current display image in the image data shown in FIG. 4B onto the image data in the enlarged scale in FIG. 4A with the same area (dimensions) forms a part of the mesh block MA. In contrast, a region 62' formed by projecting the display region 61 of the current display image in the image data shown in FIG. 4B onto the image data in the contracted scale in FIG. 4C in the same areas (dimensions) straddles a plurality of small-sized mesh blocks MC. That is, the regions, formed by projecting the display region 61 of the image data corresponding to such a current display image onto the image data with the enlarged scale and the image data with the contracted scale with the same areas (dimensions) correspond to the display region 61 in respective scales and, thus, such regions are referred to as display corresponding regions which are representatively shown in FIGS. 4A and 4C. Accordingly, the display corresponding region 62 in FIG. 4A is related to the image data in the enlarged scale differing from the current display scale and thus has a probability in which a new speech recognition object word is present, while the display corresponding region 62' in FIG. 4C is related to image data in the contracted scale differing from the current display scale and thus has another probability in which another new speech recognition object word is present.

That is, in step ST103, the speech recognition section 31 attends to execute so-called second speech recognition processing for the speech recognition object words further including the new speech recognition object words of these display corresponding regions 62, 62'. This means that, if a failure takes place in speech recognition using the speech recognition object words 60 currently displayed on the display 40 (in case of "NO" in step ST102), the speech recognition section 31 attends to execute speech recognition processing again for the speech recognition object words 60 except for the speech recognition object words currently displayed in the display 40. In other word, the speech recognition section 31 attends to execute second speech recognition processing not only for the speech recognition object words present in the display region 61 of the current display image but also for the speech recognition object words present in the display corresponding regions 62, 62' appearing in the scales (the enlarged scale in FIG. 4A and the contracted scale in FIG. 4C) different from the current display scale.

Further, in the presently filed embodiment, since map data are divided into the mesh forms and stored, the processing of step ST103 can also be executed in manner described below.

FIG. 5 is an illustrative view showing a display corresponding region 62" with map data being divided into the mesh form and stored.

As shown in FIG. 5 illustratively showing image data in the contracted scale, the speech recognition section 31 sets regions that include mesh blocks 63a to 63d which overlaps the display corresponding region 62' in the contracted scale, as a display corresponding region 62". That is, the region resulting from the display corresponding region 62' that is regionally enlarged in the scale such as the contracted scale attends to be used as the display corresponding region 62". Accordingly, the speech recognition section 31 attends to execute second speech recognition processing for the speech recognition object words involving the new speech recognition object words in the display corresponding regions 62" (63a to 63d). This means that, if a failure takes place in speech recognition using the speech recognition object words 60 currently displayed in the display 40 (in case of "NO" in step ST102), the speech recognition section 31 also attends to execute speech recognition processing again for the speech recognition object words 60 except for the speech recognition object words currently displayed on the display 40. In other word, during a series of steps up to step ST103, the speech recognition section 31 attends to execute the speech recognition processing for the speech recognition object words present in the display region 61 of the current display image or, even if they are not present in the display region 61 of the current display image, present in the display corresponding region 62" resulting from a further enlarged display corresponding region 62' that corresponds to the display region 61 in the scale, such as the contracted scale. Incidentally, the speech recognition section 31 may be configured to perform the second speech recognition processing for an object of the speech recognition object words 60 present in the mesh blocks 63a and 63b that overlap one another not less than a predetermined area (such as a value greater than one six of the area of each mesh block) among the mesh blocks 63a to 63d, which overlap with the display corresponding region 62'. Moreover, of course, the processing described with reference to FIGS. 4A to 4C and the processing described with reference to FIG. 5 may be suitably combined, and it is not objectionable to similarly enlarge not only the display corresponding region 62' in the contracted scale but also the display region 61 in the current display scale to define the display equivalent region 62" while it is not objectionable to suitably set the mesh in the enlarged scale to similarly enlarge the display corresponding region 62 to allow the display corresponding region 62" to be defined.

Turning again to FIG. 2 for further description, if the judgment is made that the speech recognition object word 60 coincided with the digital data corresponding to the voice input is present in the display corresponding region (in case of "YES" in step ST103), the processing is routed to step ST108 which will be described later. On the contrary, if the judgment is made that the speech recognition object word 60 coincided with the digital data corresponding to the voice input is not present in the display corresponding region (in case of "NO" in step ST103), the speech recognition section 31 acquires the travel history depending on the weeks and days from the vehicle history acquiring device 12 (step ST104).

Here, description is made of the travel history depending on the weeks and days.

Figures 6, 7:
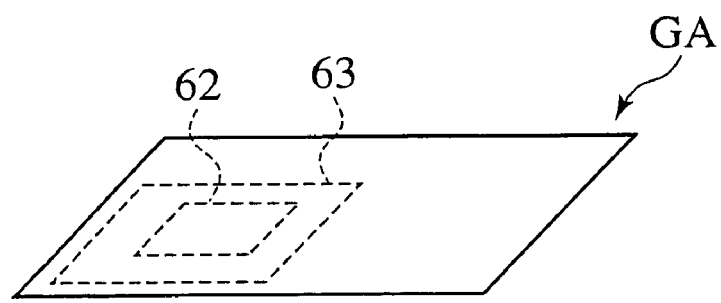
FIG. 6 is an illustrative view illustrating a travel history depending on days of the week, in the embodiment.
FIG. 7 is an illustrative view principally illustrating an expanded region in map image data in the enlarged scale, in the embodiment.

FIG. 6 is an illustrative view showing the travel history depending on the weeks and days.

In FIG. 6, the vehicle history acquiring device 12 obtains an average of respective travel distances in respect of the weekdays (Monday to Friday) and the holidays (Saturday and Sunday) and stores the same in a memory which is not shown.

In a case that a total travel distance in Monday reaches 75 km, a total travel distance in Tuesday reaches 65 km, a total travel distance in Wednesday reaches 75 km, a total travel distance in Thursday reaches 65 km and a total travel distance in Friday reaches 70 km, an average of these travel distances is obtained and stored as an average travel distance of 70 km in the weekdays. Also, in a case that a total travel distance in Saturday reaches 90 km and a total travel distance in Sunday reaches 100 km, an average travel distance in the holidays is stored as 95 km.

Turning again to FIG. 2 for further description, subsequent to step ST104, the speech recognition section 31 sets an expanded region in a predetermined scale, such as the enlarged scale, in dependence on the travel history and the land attribute for the purpose of carrying out speech recognition processing that will be described below (step ST105).

More particularly, the speech recognition section 31 acquires the land attribute of a place, in which the vehicle is currently located, based on the current positional information, inputted in step ST101, and the map data associated therewith and determines the scale to be used, such as the enlarged scale, and determines the expanded region in such scale based on the land attribute and the travel history further inputted in step ST104.

Here, although the "land attribute" involves attributes related to regions such as suburbs and cities, of course, it is not limited to these examples and may also include attributes related to roads such as mountain paths and straight roads.

Then, the speech recognition section 31 executes speech recognition processing based on the expanded region with such a scale (step ST106). That is, if the judgment is made that there is no speech recognition object word 60 in coincidence with the digital data corresponding to the voice input in respect of the display corresponding region, that is, if a failure takes place in recognition processing of the speech recognition object words 60 (in case of "NO" in step ST103), the speech recognition section 31 attends to carry out so-called second speech recognition processing for the speech recognition object words 60 present as the display object in the expanded region when rendering the current display scale to be shifted into the expanded scale. Incidentally, of course, it is possible to execute second speech recognition processing for the speech recognition object words 60 present in the expanded region, in which the current display scale per se is maintained as it is and also the display region 61 per se of the current display scale is expanded, or in the expanded region, in which the current display scale is shifted into the contracted scale and also the display corresponding region 62' of the contracted scale, as the display object.

Here, the expanded region is described below in further detail.

FIG. 7 is an illustrative view for illustrating the expanded region in image data in a typically enlarged scale. Also, a square shape in FIG. 7 indicates the map image region GA of map data in the enlarged scale similar to that of FIG. 4A.

As shown in FIG. 7, the "expanded region 63" corresponds to a region in that the display corresponding region 62 is expanded with its center in alignment with the expanded region to form a similar figure. That is, since the expanded region 63 corresponds to one in which the display corresponding region 62 is expanded in the similar figure, the expanded region 63 forms a region that is wider than the display region 61 which is currently displayed. Also, the "expanded scale" means a scale expanded in a level greater than the current display scale, that is, by at least a so-called one stage, as described with reference to FIGS. 4A and 4B. Incidentally, of course, if circumstances demand, the expanded region may take any other forms than the similar figure.

Accordingly, when in the processing of step ST106, it is possible to execute a variety of processing that can be suitably set in dependence on the settings of the expanded scale and the expanded region 63 in step ST105.

Next, the processing of step ST106 associated with such an expanded region is described more in detail in conjunction with several examples.

First, description is made of a first example of the processing in step ST106.

FIGS. 8A and 8B are views for illustrating how the expanded scale is set based on the current display scale and, in such an expanded scale, how the expanded region 63 is set, for use as a first example of the processing of step ST106. Namely, depending on the travel history, the expanded scale resulting from the current display scale expanded by the so-called one stage is set and, in such a scale, the expanded region 63 is set as if the display corresponding region 62, that is, the display region 61 is expanded. Also, the square shapes, shown in FIGS. 8A and 8B in the same size, respectively correspond to the map image region GA, in FIG. 8A, with the same expanded scale as that of FIG. 4A and the map image region GB, in FIG. 8B, with the same current display scale as that that of FIG. 4B.

More particularly, when in the processing of step ST106 in this example, in consideration of a tendency in that the travel distance in the holydays (Saturday and Sunday) is longer than that of the weekdays (Monday to Friday), the speech recognition section 31 attends to perform second speech recognition processing for the speech recognition object words 60 within the display corresponding region 62 in the weekdays and perform second speech recognition processing for the speech recognition object words 60 within the expanded region 63 that resulted from the display corresponding region 62 and expanded in consideration of the travel distance that becomes longer in the holidays.

Next, description is made of a second example of the processing in step ST106.

FIGS. 9A and 9B are views for illustrating how a plurality of expanded scales are set from the current display scale and, in such expanded scales, how expanded regions $63_1$, $63_2$ are set, for use as the second example of the processing of step ST106. Namely, depending on the travel history, an expanded scale (indicated by an arrow 1) resulting from the current display scale expanded in scale by a so-called one stage and another expanded scale (indicated by an arrow 2) resulting from the current display scale expanded in scale by so-called two stages are set, and in such scales, the expanded regions $63_1$, $63_2$ resulting from the display corresponding regions $62_1$, $62_2$ corresponding to the display region 61 are set. Also, the square shapes shown in the same size in FIGS. 9A and 9B respectively correspond to a map image region GA, in FIG. 9A, with the same expanded scale as that of FIG. 4A, a map image region GA' (with being indicated by a broken line), in FIG. 9A, with the further expanded scale by the two stages, and a map image region GB, in FIG. 9B, with the same current display scale as that of FIG. 4B. Also, for the sake of convenience, the number of mesh blocks corresponding to the map image region GA in FIG. 9A is settled to include four pieces, and the number of mesh blocks corresponding to the map image region GB in FIG. 9B is settled to include sixteen pieces.

Further, in the scale expanded by the two stages in FIG. 9A, the expanded region $63_2$ is assigned as an entire region that can be displayed on the display 40, that is, the expanded region $63_2$ is a region that corresponds to the map image region GA'. And, if desired, it is not objectionable for directly setting the expanded regions $63_1$, $63_2$ while omitting the display corresponding regions $62_1$, $62_2$.

More particularly, when in the processing of step ST106 in this example, in the weekdays, the speech recognition section 31 attends to perform second speech recognition processing for the speech recognition object words 60 of the expanded region 63, that is enlarged in the scale by the one stage from the current display scale and, in the holidays, perform second speech recognition processing for the speech recognition object words 60 of the expanded region $63_2$ that is enlarged in the scale by the two stages from the current display scale. Because, this example is contemplated to consider that the travel distance in the weekdays tends to be shorter than that of the holidays.

Next, description is made of a third example of the processing in step ST106. In the third example, the enlarged scale and the expanded region 63 are contemplated to be set in consideration of the travel history and the land attribute, more specifically, aiming at the travel distance associated with which day of the week and on which place the vehicle travels.

More particularly, when in the processing of step ST106 in this example, if in the weekdays where the travel distance is supposed to be less than a predetermined distance and the vehicle remains under traveling in the city, as shown by an arrow 1 in FIGS. 9A and 9B, the speech recognition section 31 attends to perform second speech recognition processing for the speech recognition object words 60 present in the expanded region $63_1$ in the enlarged scale that is enlarged by the one stage from the current display scale. However, in consideration of a situation wherein even when the vehicle travels in the weekdays, if the vehicle remains under traveling in the suburb, the travel distance increases and exceeds the predetermined distance, as shown by the arrow 2 in FIGS. 9A and 9B, the speech recognition section 31 attends to perform second speech recognition processing for the speech recognition object words 60 present in the expanded region $63_2$ in the enlarged scale that is enlarged by the two stages from the current display scale. On the contrary, if in the holidays where the travel distance is supposed to increase and exceed the predetermined distance, regardless of the location on which the vehicle travels, the speech recognition section 31 attends to execute second speech recognition processing for the speech recognition object words 60 present in the expanded region $63_2$ in the enlarged scale that is enlarged by the two stages from the current display scale. Incidentally, such a predetermined distance may be set to a value of approximately 40 km.

Next, description is made of a fourth example of the processing in step ST106. Like in the third example, the fourth example contemplates to allow the enlarged scale to be set in dependence on the travel history and the land attribute. However, this example differs from the third example in that in a case that the travel distance is less than the predetermined distance and the vehicle remains under traveling in the city, second speech recognition processing for recognition object words is executed not using the expanded region but using the display corresponding region in the enlarged scale that is enlarged by the one stage from the current display scale.

FIGS. 10A and 10B are views for illustrating how a plurality of expanded scales are set from the current display scale and, in such expanded scales, how the display corresponding regions $62_1$, $62_2$ and the expanded regions $63_1$, $63_2$ are set, for use as the fourth example of the processing of step ST106. Also, the square shapes shown in the same size in FIGS. 10A and 10B respectively correspond to the map image regions GA, in FIG. 10A, with the same expanded scale as that of FIG. 9A, a map image region GA' (with being indicated by a broken line), in FIG. 10A, with the further expanded scale by the two stages as that of FIG. 9A, and the map image region GB, in FIG. 10B, with the same current display scale as that of FIG. 9B. Also, for the sake of convenience, the number of mesh blocks corresponding to the map image region GA in FIG. 10A is settled to include four pieces, and the number of mesh blocks corresponding to the map image region GB in FIG. 10B is settled to include sixteen pieces. Moreover, FIGS. 11A and 11B are views for illustrating how the expanded scale of the first stage is set based on the current display scale and, in such an expanded scale, how the display corresponding region $62_1$ and the expanded region $63_1$ are set. Incidentally, the square shapes shown in the same size in FIGS. 11A and 11B respectively indicate the map image regions GA, in FIG. 11A, with the expanded scale and the map image region GB, in FIG. 11B, with the current display scale. Also, in the figure, since the meshes are similar to those of FIGS. 10A and 10B, description of the same is herein omitted.

More particularly, when in the processing of step ST106 in this example, if in the weekdays, the travel distance is supposed to be less than the predetermined distance and the vehicle remains under traveling in the city, as shown by the arrow 1 in FIGS. 9A and 9B, the speech recognition section 31 attends to perform second recognition processing for the speech recognition object words 60 present in the display corresponding region $63_1$ in place of the expanded region $63_1$ used in the third example with the enlarged scale being enlarged by the one stage from the current display scale. However, in consideration of a situation where even in the weekdays, if the vehicle remains under traveling in the suburb, the travel distance increases and exceeds the predetermined distance, like in a manner as shown by the arrow 2 in FIGS. 9A and 9B, the speech recognition section 31 attends to perform second recognition processing for the speech recognition object words 60 present in the expanded region $63_2$ in the enlarged scale that is enlarged by the two stages from the current display scale. On the contrary, if in the holidays where the travel distance is supposed to increase and exceed the predetermined distance, regardless of the location on which the vehicle travels, the speech recognition section 31 attends to execute second recognition processing for the speech recognition object words 60 present in the expanded region $63_2$ in the enlarged scale that is enlarged by the two stages from the current display scale. Incidentally, such a predetermined distance may be set to a value of approximately 40 km.

Like in the first to fourth examples set forth above, by using the display corresponding region as it is or using the expanded region in the enlarged scale determined in step ST105, in other words, by utilizing one of or both the expanded region and the enlarged scale, the processing of step ST 106 is executed. Incidentally, it is of course to be noted that in the first to fourth examples, like in step ST103, second speech recognition processing may be made for the speech recognition object words 60 present in the mesh blocks $63a$ to $63db$, which overlap one another, or second speech recognition processing may be made by selecting those which overlap over an extent not less than a predetermined area among the mesh blocks $63a$ to $63d$ that overlap one another.

Turning again to FIG. 2, explanation is made of processing. In the speech recognition section 31, if the judgment is made that the speech recognition object word 60 in coincidence with the digital data corresponding to the voice input is present in the expanded region (in case of "YES" in step ST106), the processing is routed to step ST108 that will be described below. In contrast, if the judgment is made that the speech recognition object word in coincidence with the digital data corresponding to the voice input is not present in the expanded region (in case of "NO" in step ST106), the judgment is further executed to find whether the speech recognition object words 60 present in the other region than that made to be the object is in coincidence with the digital data (step ST107).

Figures 12A, 12B, 12C:
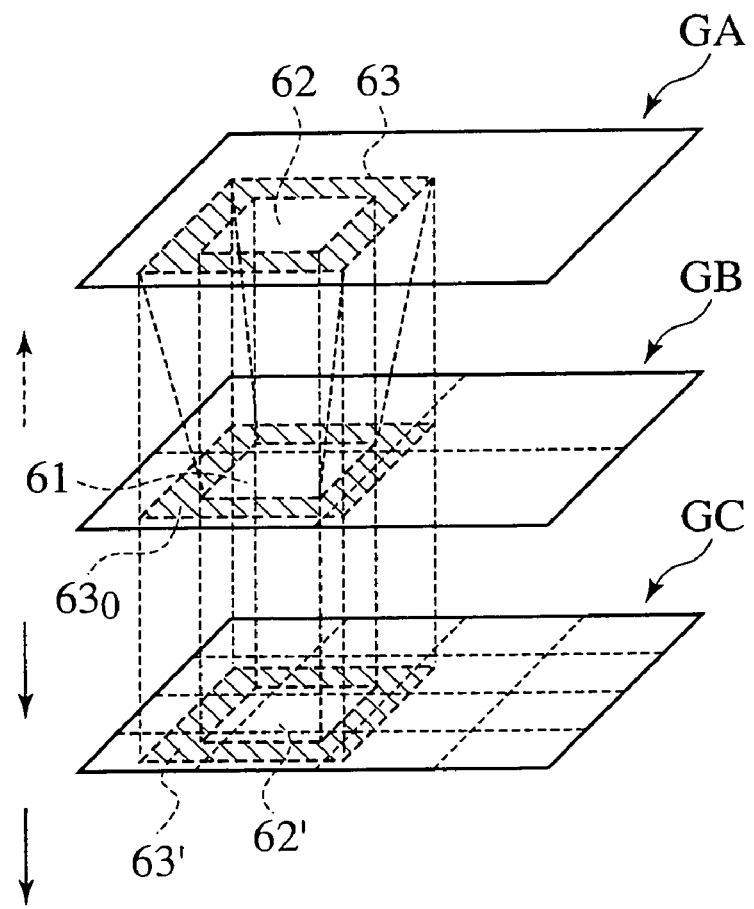
FIG. 12A is an illustrative view principally illustrating an expanded region in map image data in an enlarged scale for use in the processing of step ST107.
FIG. 12B is an illustrative view principally illustrating an expanded region in map image data in a current display scale for use in the processing of step ST107.
FIG. 12C is an illustrative view principally illustrating an expanded region in map image data in contracted scale for use in the processing of step ST107, respectively in the embodiment.

FIGS. 12A to 12C are views illustrating the processing of step ST107.

As shown in FIGS. 12A to 12C, in step ST107, the speech recognition section 31 attends to execute second speech recognition processing for the region except for the display corresponding regions 62, 62' and the display region 61 within the expanded regions 63, $63_0$, 63', respectively. The square shapes shown in the same size in FIGS. 12A to 12C respectively correspond to the map image regions GA, in FIG. 12A, in the enlarged scale and the map image region GB, in FIG. 12B, in the current display scale and a map image region GC, in FIG. 12C, in the contracted scale. Also, the expanded regions 63, $63_0$, 63' are the regions that are expanded and set in the same way as that of step ST106.

More particularly, in the enlarged scale shown in FIG. 12A, second speech recognition processing is executed in respect of a region except for the display corresponding region 62 in the expanded region 63, and in the current display scale shown in FIG. 12B, second speech recognition processing is executed in respect of a region except for the display region 61 in the expanded region $63_0$, while in the contracted scale shown in FIG. 12C, second speech recognition processing is executed in respect of a region except for the display corresponding region 62' in the expanded region 63'. Here, typically, since the processing for the judgment to find whether the speech recognition object word 60 corresponding to image data in the enlarged scale is present has been terminated during the processing of step ST106, as shown in FIGS. 12B and 12C, the speech recognition section 31 serves to execute second speech recognition processing for the speech recognition object words 60 present in the region except for the display corresponding region 62' in the expanded region 63' remaining in the contracted scale resulting from the current display scale that is contracted by the one stage. Of course, if circumstances demand, as shown in FIGS. 12A and 12B, second speech recognition processing may be executed in respect of the region except for the display corresponding region 62 in the expanded region 63 with the enlarged scale, and if circumstances demand, second speech recognition processing may be executed in respect of the region except for the display region 61 within the expanded region 63$_0$ while allowing the current display scale shown in FIG. 12B to be maintained.

Here, in the speech recognition section 31, if the judgment is made that the speech recognition object word 60 coincided with the digital data corresponding to the voice input is present in such other region (in case of "YES" in step ST107), the processing is routed to step ST108. On the contrary, if the judgment is made that no such a speech recognition object word 60 is present in such other region, the speech recognition section 31 sequentially lowers a hierarchy of the scale to advance steps of the contracted scale and executes second speech recognition processing for the speech recognition object words 60 present in the other region with such lowered scale. And, with respect to all the scale hierarchies that are preliminarily prepared, if the judgment is made that no speech recognition object word 60 coincided with the digital data corresponding to the voice input is present (in case of "NO" in step ST107), the processing is shifted to step ST109. That is, if a failure takes place in recognition the processing with the enlarged scale (in case of "NO" in step ST106), then, the speech recognition section 31 attends to carry out second speech recognition processing for the speech recognition object words 60 present in the other region that has not been regarded to be a recognition object region up to now within the expanded region 63' or the like at the scale which is typically contracted from the current display scale. Also, the number of times where the current display scale is to be contracted is not limitative and, if desired, it may not be objectionable for the contraction to be executed only one time.

Incidentally, in the processing of step ST107, as shown in FIG. 5, like in steps ST103, ST106, second speech recognition processing may be executed in respect of the region overlapped with the mesh blocks and, among the regions overlapped with the mesh blocks in such a way, selecting one which overlaps at a ratio not less than a predetermined area may also allow second speech recognition processing to be executed.

Turning now again to FIG. 2 and description is made. As set forth above, if the judgment is made that the speech recognition object word 60 coincided with the digital data corresponding to the voice input is present in the image of the current display screen (in case of "YES" in step ST102), if the judgment is made that the speech recognition object word 60 coincided with the digital data corresponding to the voice input is present within the display corresponding region (in case of "YES" in step ST103), if the judgment is made that the speech recognition object word 60 coincided with the digital data corresponding to the voice input is present within the expanded region (in case of "YES" in step ST106) and if the judgment is made that the speech recognition object word 60 coincided with the digital data corresponding to the voice input is present within the other region in the display scale in which the display scale is typically contracted (in case of "YES" in step ST107), the display processor section 32 compels the map image that includes the speech recognition object word 60 recognized through such recognition processing to be displayed on the display 40 (step ST108).

Figure 13:
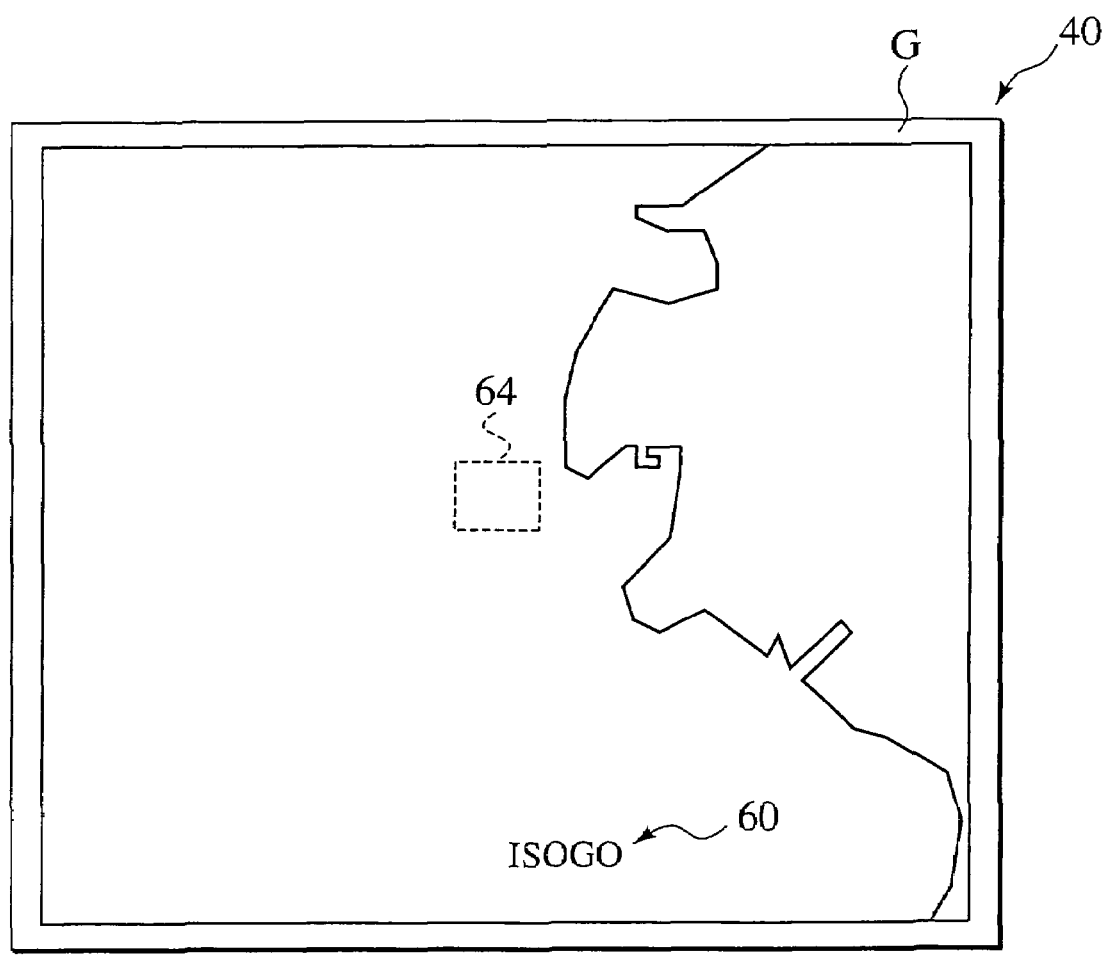
FIG. 13 is an illustrative view illustrating a map image on a screen of a display provided by the processing in step ST108, in the embodiment.

More specifically, in the presence of the speech recognition object word 60 within the screen that is currently displayed (in case of "YES" in step ST102), the display processor section 32 keeps the display scale as it is and allows the speech recognition object word 60, which is recognized, to be emphasized on the display 40. On the contrary, in the absence of the speech recognition object word 60 within the screen that is currently displayed (in case of "YES" in step ST103, step ST106 and step ST107), the display scale is altered so as to allow the speech recognition object word 60 to appear to be displayed on the screen of the display 40 in the emphasized manner. For example, as shown in FIG. 13, if the user utters a word of "ISOGO" in a situation where no word of "ISOGO" is displayed on the screen of the display 40, the display processor section 32 alters the display scale to allow the image including the word of "ISOGO" to be provided on the display 40 with the word of "ISOGO" being emphasized. And, the processing is shifted to step ST 110. Incidentally, reference numeral "64" in FIG. 13 schematically indicates the region in the original display scale and this means that the display scale is altered in a way to allow a wider region than that of such an original display scale to be displayed.

Subsequently, the navigation device 1 executes navigation processing (step ST110). That is, in a situation where the user utters commands "Look at a certain object" or "Go to a certain object place" (with such a certain object or such an object place being in charge of the speech recognition object word 60), the navigation device 1 operates to, for example, display a district, designated by the speech recognition object word 60, at the center portion of the screen of the display 40 or to set such a district to a destination for guide thereto.

On the contrary, if the judgment is made that no speech recognition object word 60 coincided with the digital data corresponding to the voice input is present in any of the hierarchies (in case of "NO" in step ST107), the display processor section 32 provides such a result of speech recognition on the display 40 so as to indicate that the speech recognition object word 60 is not present. That is, a particular range (a display scale range, such as a range from 500 m to 10 km) of the hierarchy that is made the object for the second speech recognition processing is displayed on the display 40 (step ST109). Moreover, in this instance, the display processor section 32 compels the speaker 50 to produce a voice for notifying the user with the information with no coincidence with the speech recognition object word 60. And, the current processing is terminated.

Incidentally, although plural speech recognition processing (step ST103, step ST106 and step ST107) have been carried out in the embodiments set forth above, either processing may be carried out one time, and also either ones of second speech recognition processing in respective examples in step ST 106 may be carried out more than two times in a sense of complementary purpose.

As described above, in the navigation device of the present invention, if a failure takes place in the recognition of the speech recognition object word, the speech recognition section executes the second speech recognition processing for the speech recognition object word except for the speech recognition object word currently displayed on the display. In particular, the second speech recognition processing is executed not only for the speech recognition object word present in the display region but also for the speech recognition object word that should be the display object whose display scale is rendered to be different from the current display scale. For this reason, even if the speech recognition object word not displayed in the current display scale is uttered by the user, it becomes possible to recognize such a speech recognition object word. Accordingly, the command of the speech recognition object word can be accomplished in an easy and reliable manner.

Further, with the normal navigation device, there are many probabilities in which the speech recognition object word is located at a given position within its corresponding district in the map image. For this reason, although a part of such a district is displayed, if such a given position is not displayed, a situation occurs in that the speech recognition object word suffers from an inability to be displayed while causing an obstacle to be encountered in the voice input. However, in the presently filed embodiment, since the speech recognition section performs recognition processing even for the speech recognition object word that form the display object which is present within the expanded region and when the current display scale is converted to the enlarged scale, the command for the speech recognition object word can be more easily and reliably performed.

Furthermore, since the speech recognition section sets the display scale and the expanded region depending on the travel history of the vehicle, the second speech recognition processing can be executed depending on the weeks and days while, for example, storing the travel history as the history classified with the weeks and days, resulting in a capability of performing the speech recognition in a further efficient and reliable manner.

Furthermore, since the speech recognition section sets the display scale and the expanded region depending on the current position of the vehicle and the land attribute, the second speech recognition processing can be executed depending on the current position (such as the cities and suburbs) of the vehicle, resulting in a capability of performing the speech recognition in a further efficient and reliable manner.

Moreover, the speech recognition section performs the recognition processing for the speech recognition object word that forms the display object present within the expanded region and in the display scale whose enlarged scale is enlarged or contracted. In particular, the speech recognition section attends to perform the speech recognition in the expanded region for the speech recognition object word, covering from a wider area display with relatively famous mountains and buildings being principally displayed to a detailed display in which a further fine display is performed. Accordingly, the second speech recognition processing covering wide ranges and multiple hierarchies can be performed, enabling an accuracy of the recognition of the speech recognition object word to be increased.

Further, since the speech recognition section performs the second speech recognition processing for the speech recognition object word, which is present in the mesh blocks overlapped with the display region in the suitable display scale to be the display object, it is possible to achieve the processing at a higher speed than that attained when individually extracting the map data into the speech recognition object words by a unit of the mesh block. Moreover, likewise, it is possible to similarly achieve the recognition processing at a high speed for the speech recognition object word in the mesh blocks overlapped with the display corresponding region or the expanded region.

In addition, since the speech recognition section performs the second speech recognition processing for the speech recognition object word which is present in the mesh blocks overlapped at a rate not less than the predetermined area among the mesh blocks which overlap one another, the second recognition processing in respect of the mesh blocks that only overlap at a rate less than the predetermined area can be omitted, enabling the processing to be executed at a further increased speed.

Also, since the display processor section provides the range of the display scale, which is made the object for the second speech recognition processing, on the display, if the word uttered by the user is not voice recognized, the user is able to know the range of the display scale that is made the object for second recognition processing and, thus, it becomes possible to find out the words uttered by the user from the range that is not made the object for second recognition, resulting in an improved serviceableness.

Additionally, since the display processor section allows the map image involving the speech recognition object word, recognized upon the second speech recognition processing, to be displayed on the display, the user is able to confirm its location, resulting in a further improved serviceableness. Especially, due to an ability of permitting the current position of the vehicle, in addition to the position of the speech recognition object word, to be displayed on the display, it becomes possible to confirm a distance between the vehicle location and a position which the user demands to designate, thereby enabling a further improved serviceableness to be provided.

The entire content of a Patent Application No. TOKUGAN 2002-329554 with a filing date of Nov. 13, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A navigation device to be installed on a vehicle and enabling information to be provided to an occupant of the vehicle, the navigation device comprising:
   a display section displaying an image to an occupant of a vehicle;
   a speech recognition section executing speech recognition processing to recognize a voice input relating to a speech recognition object word, word, second speech recognition processing is to be executed when a failure occurs in recognition as to the speech recognition object word present in the image currently displayed in the display section, while using the speech recognition object word except for the speech recognition object word present in the image currently displayed in the display section; and
   an information providing processor section compelling a predetermined image to be displayed on the display section based on a recognized content resulting through the speech recognition processing when the speech recognition object word is recognized through the speech recognition processing.

2. The navigation device according to claim 1, wherein the speech recognition section executes the second speech recognition processing for the speech recognition object word that is present as a display object in a display scale different from a display scale of the image currently displayed on the display section.

3. The navigation device according to claim 1, wherein the speech recognition section executes at least one of the second speech recognition processing for the speech recognition object word that is present as a display object in an expanded region obtained by enlarging a display region of the image currently displayed on the display section and the second speech recognition processing for the speech recognition object word that is present as a display object when a display scale of the image currently displayed on the display section is rendered to be an enlarged scale.

4. The navigation device according to claim 3, wherein the speech recognition section executes at least one of the second speech recognition processing relating to the expanded region and the second speech recognition processing relating to the enlarged scale, based on a travel history of the vehicle.

5. The navigation device according to claim 3, wherein the speech recognition section executes at least one of the second speech recognition processing relating to the expanded region and the second speech recognition processing relating to the enlarged scale, based on a land attribute of a current position of the vehicle.

6. The navigation device according to claim 1, wherein the speech recognition section executes the second speech recognition processing for a speech recognition object word that is present as a display objcet in an expanded region obtained by enlarging a display region of the image currently displayed on the display section and when a display scale of the image currently displayed on the display section is rendered to be a contracted scale.

7. The navigation device according to claim 1, further comprising a data section that divides map data, for the image to be displayed on the display section, into mesh-like blocks and stores the map data,
wherein the speech recognition section executes the second speech recognition processing for the speech recognition object word that is present as a display object in an overlapped block, which is overlapped with a display region of the image currently displayed on the display section among the mesh-like blocks, and in a display scale different from a display scale of the image currently displayed on the display section.

8. The navigation device according to claim 7, wherein the speech recognition section executes the second speech recognition processing for the speech recognition object word present in the overlapped block that is overlapped with the display region at a rate not less than a predetermined region.

9. The navigation device according to claim 1, further comprising a data section that divides map data, for the image to be displayed on the display section, into mesh-like blocks and stores the map data,
wherein the speech recognition section executes the second speech recognition processing for the speech recognition object word that is present as a display object in an overlapped block, which is overlapped with an expanded region obtained by enlarging a display region of the image currently displayed on the display section, and when a display scale of the image currently displayed on the display section is rendered to be an enlarged scale.

10. The navigation device according to claim 9, wherein the speech recognition section executes the second speech recognition processing for the speech recognition object word present in the overlapped block that is overlapped with the display region at a rate not less than a predetermined area.

11. The navigation device according to claim 1, further comprising a data section that divides map data, for the image to be displayed on the display section, into mesh-like blocks and stores the map data,
wherein the speech recognition section executes the second speech recognition processing for the speech recognition object word that is present as a display object in an overlapped block, which is overlapped with an expanded region obtained by enlarging a display region of the image currently displayed on the display section, and when a display scale of the image currently displayed on the display section is rendered to be a contracted scale.

12. The navigation device according to claim 11, wherein the speech recognition section executes the second speech recognition processing for the speech recognition object word present in the overlapped block that is overlapped with the display region at a rate not less than a predetermined area.

13. The navigation device according to claim 1, wherein the display processor section allows a range of a display scale that is made to be an object for the second speech recognition processing to be further displayed on the display section.

14. The navigation device according to claim 1, wherein the display processor section allows the speech recognition object word recognized through the second speech recognition processing to be further displayed on the display section.

15. A navigation device adapted to be installed on a vehicle and enabling information to be provided to an occupant of the vehicle, the navigation device comprising:
displaying means for displaying an image to an occupant of a vehicle;
speech recognition processing means for processing to execute speech recognition processing to recognize a voice input relating to a speech recognition object word, the speech recognition processing including second speech recognition processing to be executed when a failure occurs in recognition as to the speech recognition object word present in the image currently displayed in the display section while using the speech recognition object word except for the speech recognition object word present in the image currently displayed in the display section; and
information providing processing means for processing to compel a predetermined image to be displayed on the display section based on a recognized content resulting through the speech recognition processing when the speech recognition object word is recognized through the speech recognition processing.

16. A method of recognizing a speech in a navigation device adapted to be installed on a vehicle and enabling information to be provided to an occupant of the vehicle through a display section, the method comprising:

executing, when speech recognition processing to recognize a voice input relating to a speech recognition object word that is a word to be an object for speech recognition is performed and in the presence of a failure of recognition for the speech recognition object word present in the image currently displayed in the display section, second speech recognition processing using the speech recognition object word except for the speech recognition object word present in the image currently displayed in a display section; and displaying, when the speech recognition processing for the voice input relating to the speech recognition object word and in the presence of recognition of the speech recognition object word, a predetermined image on the display section based on a recognized content resulting through the speech recognition processing.

\* \* \* \* \*